United States Patent
Och et al.

(10) Patent No.: US 6,540,298 B2
(45) Date of Patent: Apr. 1, 2003

(54) SYSTEM FOR THE DISPLACEMENT OF A NECK REST IN RESPONSE TO THE DISPLACEMENT OF A VEHICLE SEAT IN AN AUTOMOBILE

(75) Inventors: Roland Och, Rottendorf (DE); Werner Seppelt, Wunstorf (DE); Gerd Fischer, Röttingen (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 24 days.

(21) Appl. No.: 09/849,991

(22) Filed: May 8, 2001

(65) Prior Publication Data

US 2001/0043005 A1 Nov. 22, 2001

(30) Foreign Application Priority Data

May 17, 2000 (DE) .......................................... 100 24 337

(51) Int. Cl.[7] ................................................ B60N 2/48
(52) U.S. Cl. ..................................... 297/410; 297/344.1
(58) Field of Search ................................ 297/61, 344.1, 297/391, 410

(56) References Cited

U.S. PATENT DOCUMENTS

| 4,285,545 | A | * | 8/1981 | Protze | 297/61 |
| 5,464,269 | A | * | 11/1995 | Mizelle | 297/61 |
| 5,918,940 | A | * | 7/1999 | Wakamatsu et al. | 297/410 |
| 6,095,606 | A | * | 8/2000 | Opsvik | 297/353 |

FOREIGN PATENT DOCUMENTS

| DE | 195 13 705 | 2/1908 |
| DE | 37 18 126 | 12/1988 |
| DE | 196 31 454 | 2/1998 |
| DE | 198 30 753 | 1/2000 |

* cited by examiner

Primary Examiner—Peter R. Brown
(74) Attorney, Agent, or Firm—Lowe Hauptman Gilman & Berner, LLP

(57) ABSTRACT

A system for the displacement of a neck rest in response to the displacement of a vehicle seat in an automobile, wherein the neck rest is mounted to a first structural part which is height-displaceably mounted to a second structural part, the latter being fixedly secured to the rest of the seat, the system having the following features:

a rope defining a loop to transfer a force along the loop, one section of the rope being connected to the first structural part, the rope being guided about two spaced idle rollers, one of the rollers being rotatably supported by the seat and the other by the second structural part a first coupling part fixedly connected to the rope a second coupling part fixedly connected to the vehicle a coupling element movably supported on the seat and selectively engageable with the first coupling part actuating means for the coupling element on the seat adapted to coact with the second coupling part in response to the position of the seat such that in a forward position and upon displacement of the seat from the forward towards the rear position along a predetermined path or upon displacement of the seat from a rear position towards the forward position after a predetermined path the second coupling part coacts with the actuating means such that the coupling element is positively connected to the first coupling part and the second coupling part and locking means which lock the first coupling part when the coupling element is in disengagement with the first coupling part.

31 Claims, 5 Drawing Sheets

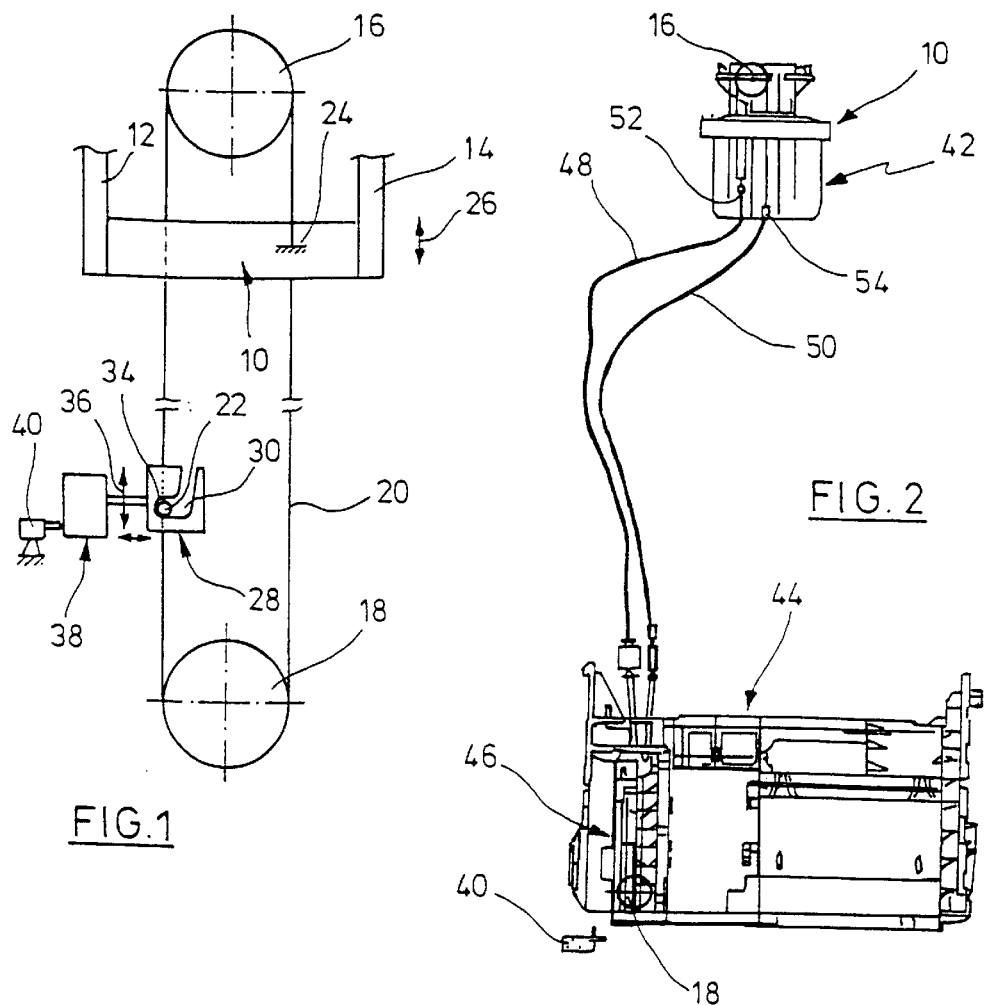
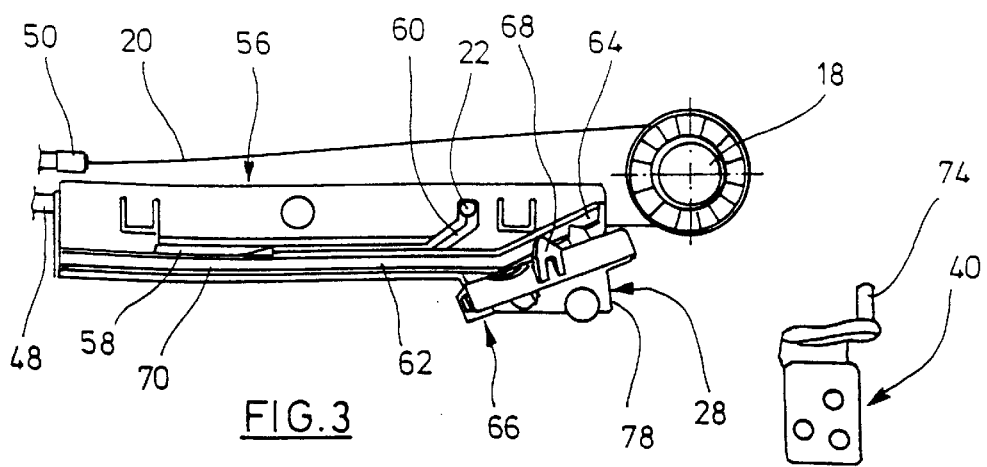

SYSTEM FOR THE DISPLACEMENT OF A NECK REST IN RESPONSE TO THE DISPLACEMENT OF A VEHICLE SEAT IN AN AUTOMOBILE

TECHNICAL FIELD

The invention relates to a system for the displacement of a neck rest in response to the displacement of a vehicle seat in an automobile.

BACKGROUND ART

A system for the automatic displacement of a neck rest has become known from DE 198 30 753. The system concerns an automatic neck rest retraction while the vehicle seat is tilted to the front. The neck rest is biased by a spring to a predetermined height position and is retracted by means of a single pulling element while the seat is tilted.

A longitudinally adjustable vehicle seat having a height-displaceable neck rest has become known from DE 195 13 705 A1. The adjustment in height of the neck rest is made dependent on the seat's longitudinal adjustment position to such an extent that the neck rest takes its lowest position when the seat is in its foremost position and takes its highest position when the seat is in its rearmost position. A structural part which is height-displaceably mounted in the seat back and is connected to the bars of the neck rest is actuated via a reversed pulling rope which is connected to the lower end adjacent to an end of the top rail of the pair of seat rails. DE 37 18 126 A1 has made known a combined seat length and seat height displacing system for vehicle seats in which, upon activation of the seat height vertical displacing system, an activation of the horizontal seat length displacing system can be initiated in a sense that the distance between the heel point and the hip point of a person using the vehicle seat is maintained in accordance with a resultant overall movement of the vehicle seat. This activation of the displacing system may be coupled to an engine-driven neck rest displacing system. An engine-driven neck rest displacing system has also become known from DE 196 31 454 A1.

SUMMARY OF THE INVENTION

In some cases, it is desirable to effect the automatic coupling between the longitudinal seat displacing system and the neck rest position in a mechanical manner, i.e. only via a limited displacement path of the seat.

Therefore, it is an object of the invention to provide a system for the displacement of a neck rest in response to the displacement of a vehicle seat wherein a coupling of the two parts is intended to be performed only via a limited path of the seat. Moreover, the neck rest is intended to be locked with no regard to the position of the seat.

The inventive system provides for a rope defining a loop which is guided about two idle rollers which are fixedly connected to the seat. One idle roller fixedly connected to the seat back is above a first structural part to which the neck rest is fixed, and is height-displaceably mounted to a second structural part fixedly connected to the seat back. The second roller is in the lower frame of the seat which is displaceable along a rail assembly which is fixedly connected to the vehicle and vehicle bottom. It is understood that more idle rollers may be provided for guiding the rope from the seat back into the seat frame. The rope has connected thereto a coupling part, e.g. a so-called barrel, as is common for pulling cables or Bowden cables. Furthermore, a coupling element is provided which is movably supported in the seat and is selectively engageable with or disengageable from the first coupling part. An actuating means for the coupling element on the seat is actuated by a coupling part fixedly connected to the vehicle. Such actuation is performed in response to the position of the vehicle seat. In a forward position or the foremost position of the seat, the coupling part fixedly connected to the vehicle is in engagement with the actuating means which, in turn, positively grips the coupling element. Now, if the seat is displaced to the rear from this position the first coupling part is retained and a relative movement takes place between the coupling part and the idle rollers, which causes the neck rest to be extracted.

The engagement between the actuating means and the coupling part fixedly connected to the vehicle is only effected along a limited path and the neck rest will be displaced only as long as this engagement persists. Subsequently, the second coupling part gets out of engagement with the actuating means, which also terminates the engagement of the coupling element with the first coupling part. Now, the seat may be displaced more to the rear with no need to actuate the neck rest once more.

Finally, the inventive system provides for locking means which lock the first coupling part when the coupling element is in disengagement with the first coupling part. In this way, a provision is made that if the seat continues to be displaced to a rear position the neck rest remains in the position it has taken and can neither be extracted nor retracted.

Thus, the invention provides that the displacement of the neck rest be automatically coupled to the first displacement path of a seat to the rear from a forward position. For example, a coupling between the displacing system of the two parts is performed only along a path of from 80 to 100 mm whereas the neck rest invariably maintains its position for the rest of the displacement path. It is understood that if there is a displacement to the forward position from a rearward one the second coupling part will again get into engagement with the actuating means if these have arrived at the second coupling part in order to cause the coupling element to be coupled to the rope again until the seat is displaced to the front or foremost positions. At this point, the locked position of the neck rest is always ensured.

Various constructional versions are possible in designing the coupling element and the actuating means. One aspect of the invention comprises an elongated guidance fixedly connected to the seat and having a first and a second guiding portion, a locking element which is guided along a second elongated guidance fixedly connected to the seat and having a first and a second guiding portion with the first guiding portion of first and second guidance each extending approximately parallel, and the second guiding portion of first and second guidance are preferably angulated with respect to the first guiding portion towards the same side wherein the coupling element is linked to the locking element and guided along a third elongated guidance fixedly secured to the seat, the second guidance extending approximately parallel to the first guiding portion of the first and the second guidance, with the coupling element engaging the second coupling part if the seat is in a forward position and the locking element is within the area of the first guiding portion of the second guidance while the second coupling part is in disengagement with the locking element if it is in the second guiding portion of the second guidance, the coupling element has a coupling slot such that the first coupling part engages an inner end portion of the coupling slot if the first coupling part is in the first guiding portion of the first guiding whereby through a movement of the coupling element in both directions the first coupling part is also moved, however, is moved out of the inner end portion if the first coupling part is in the second guiding portion of the first guidance, and the coupling element has a stop surface which restricts an engagement recess of the locking element, which recess becomes free when the locking element is pivoted upon an engagement of the locking element with the second guiding portion of the second guidance. In this aspect of the invention, the first guidance provides for the first coupling part, e.g. the barrel fixed to the rope, to be moved out of the coupling slot or to be relieved of its positive engagement with the coupling element when the first coupling part gets into the second guiding portion and is pivoted accordingly. Then, another relative movement between the coupling element and the first coupling part will smoothly be possible. A displacement of the neck rest will no longer occur. However, as the locking element is no longer intended to be carried along, if possible, there is also a uncoupling action between the second coupling part and the locking element so that the coupling part completely gets out of engagement with the actuating means. In the embodiment described last, this is done by pivoting the locking element which then releases the coupling part. The locking element is pivoted by the second guidance by the fact that a coupling portion of the locking element gets into the second guiding portion of the second guidance. At the end of the second guiding portion of the first guidance, the first coupling part is held in such a way that pulling the rope in both directions does not cause the coupling part to be displaced in the first guidance or the second guiding portion of the first guidance.

BRIEF DESCRIPTION OF THE DRAWINGS

It is particularly advantageous if the mentioned guidances are provided on a unitary structural part which is joined to the seat structure.

To make the inventive system efficient, it requires that the rope defining a loop is sufficiently tightened. Therefore, care should be taken during assembly to balance out tolerances and to create sufficient tension after the pulling rope is mounted. In addition, care should be taken to re-tighten the pulling rope if it should have lengthened after a certain period.

Now, an embodiment of the invention will be explained in more detail with reference drawings.

FIG. 1 extremely schematically shows the system according to the invention.

FIG. 2 also schematically shows the system of FIG. 1 including further details.

FIG. 3 shows a guiding rail of the system of FIG. 2 including a second coupling part.

Figure 4:
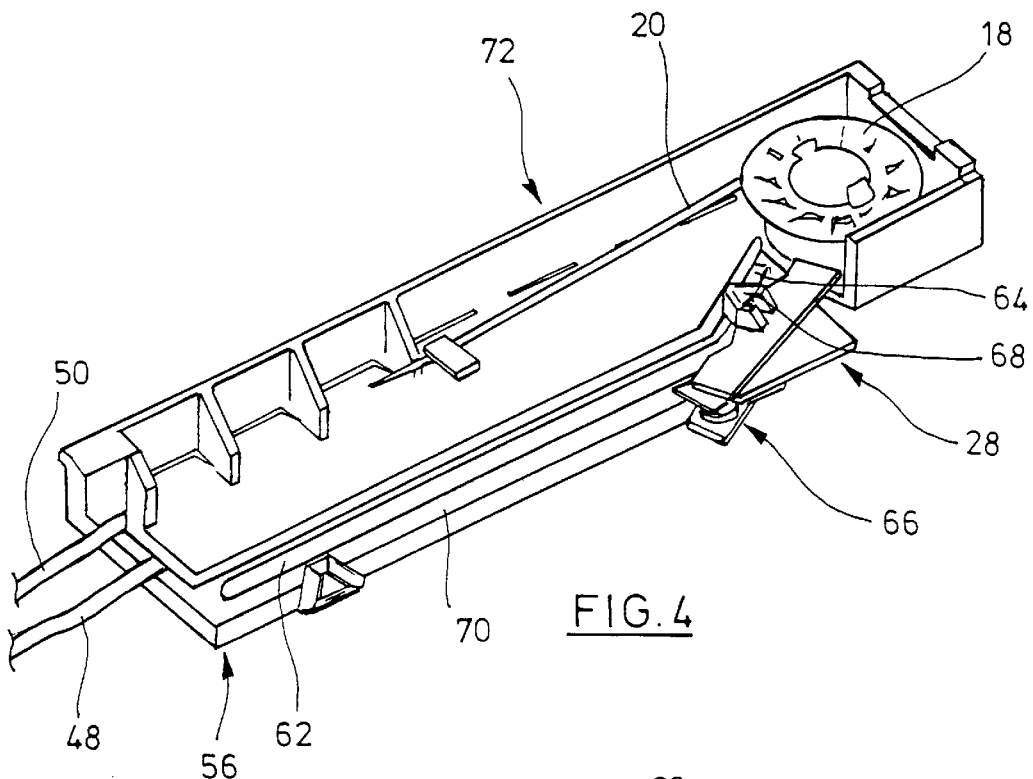

FIG. 4 shows the guiding rail of FIG. 3 in a structural holding part.

Figure 5:
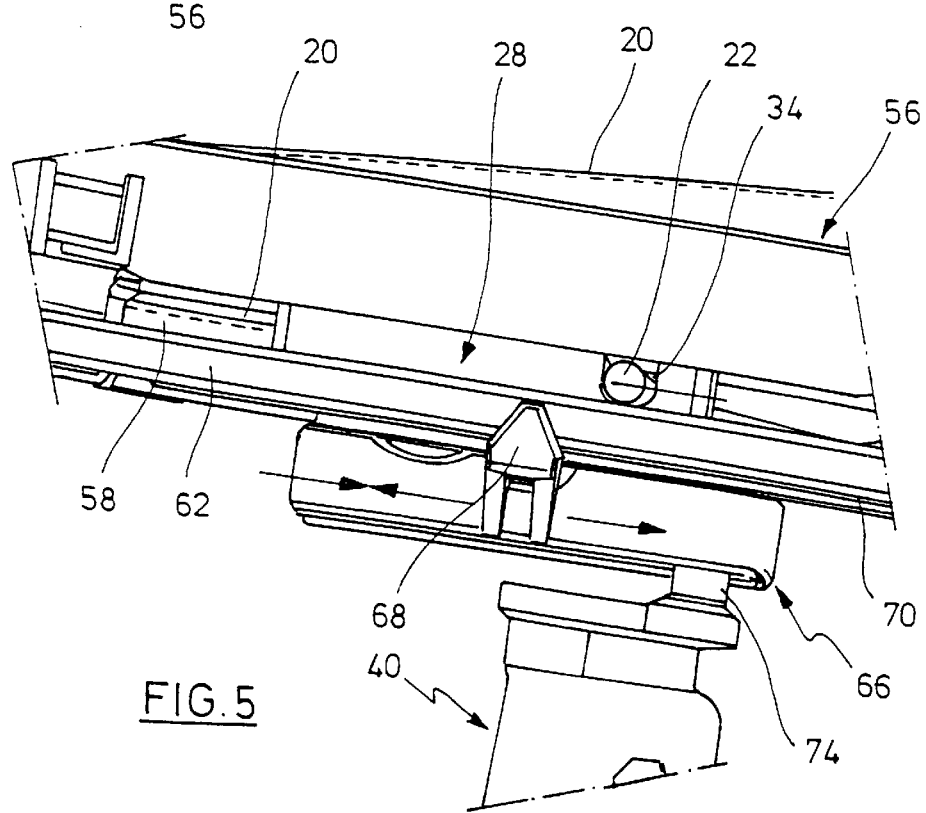

FIG. 5 shows a perspective view of an enlarged portion of the representation of FIGS. 3 or 4.

Figure 6:
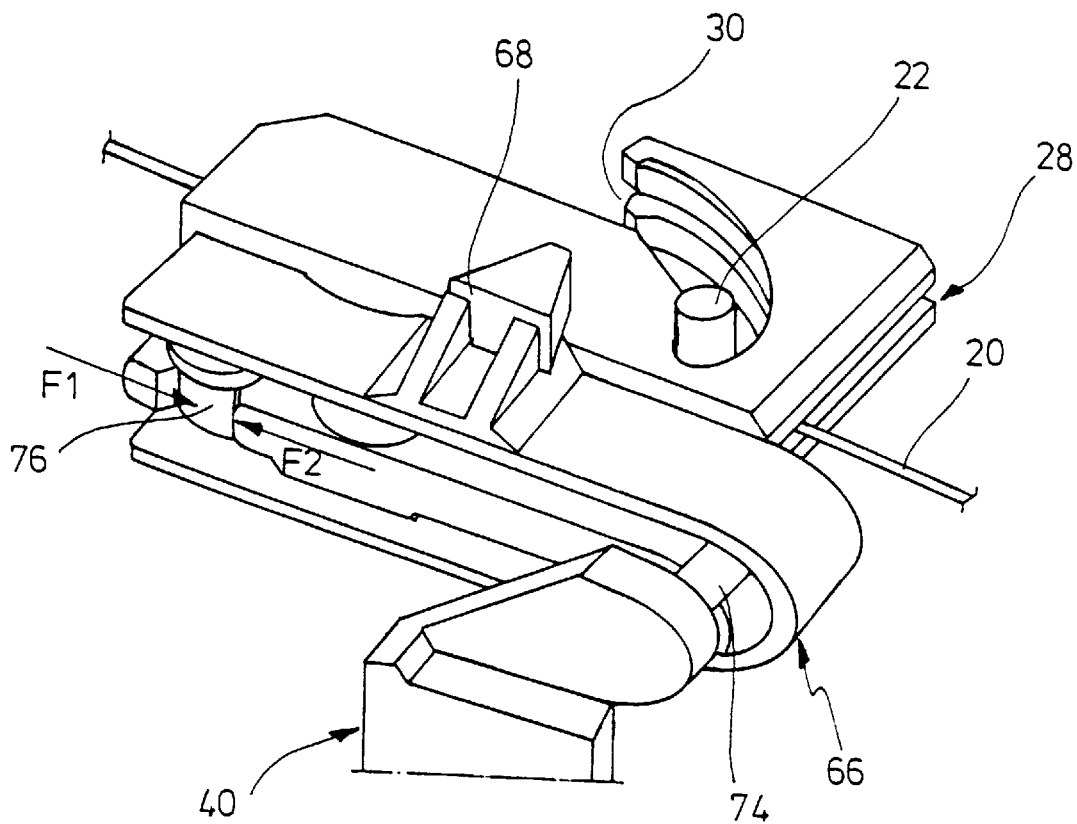

FIG. 6 shows a representation similar to FIG. 5, but with the guiding rail omitted.

Figure 7:
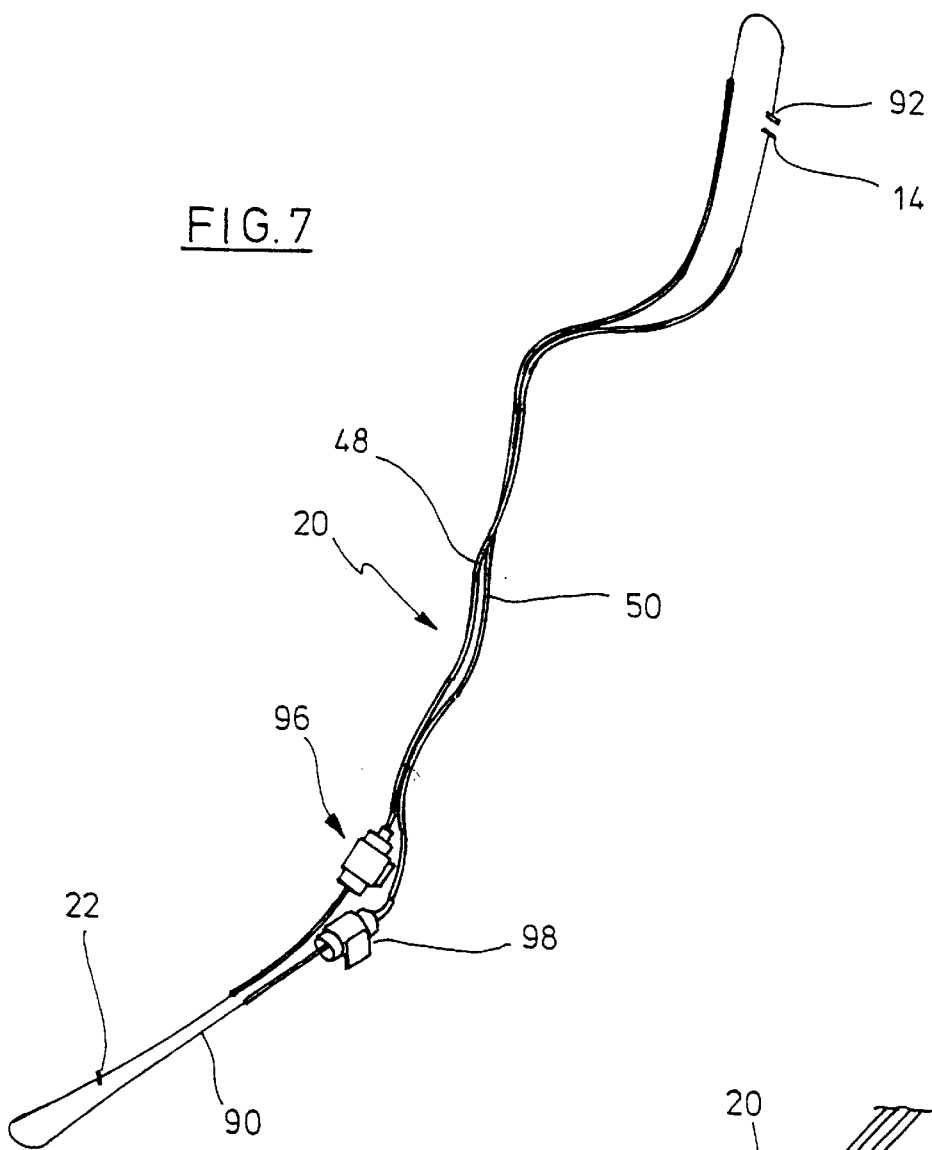

FIG. 7 shows the rope of FIGS. 1 or 2.

Figure 8:
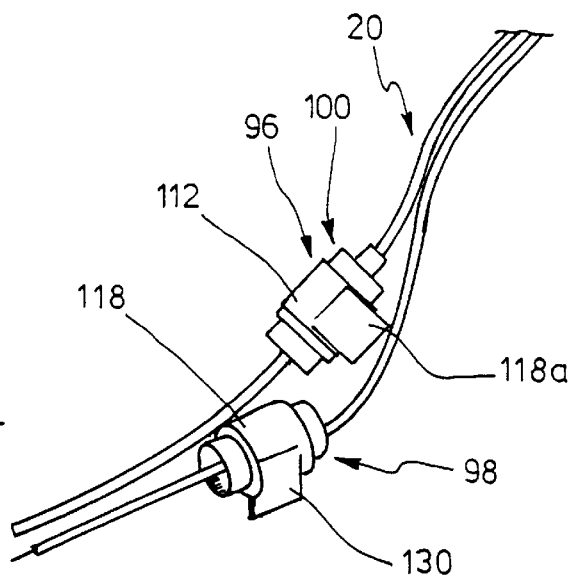

FIG. 8 shows an enlarged portion of FIG. 7.

Figure 9:
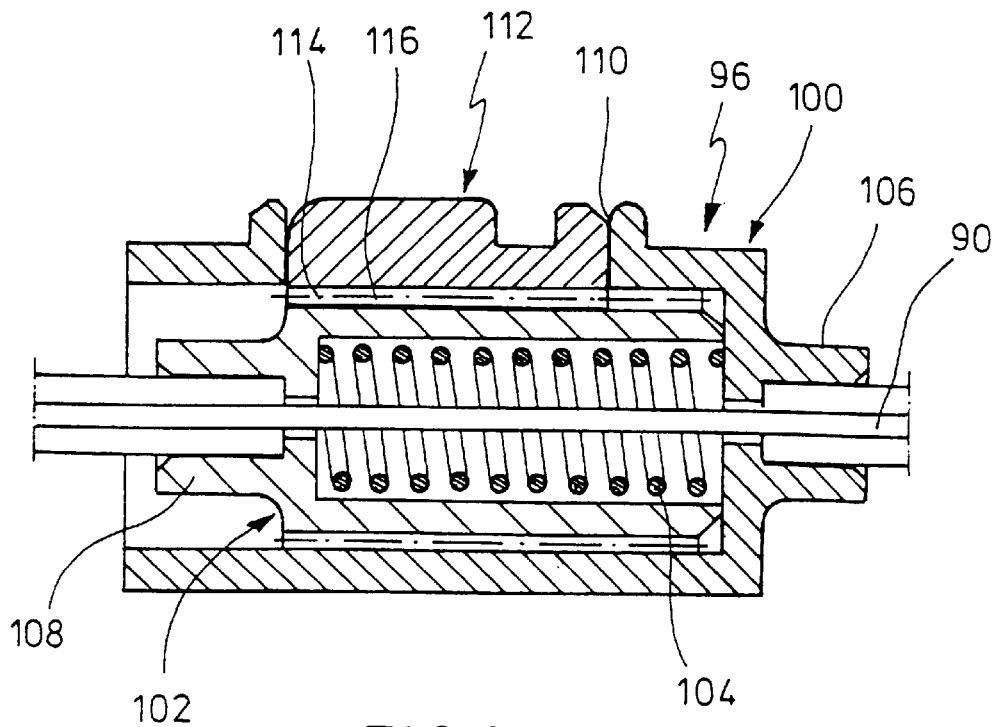

FIG. 9 shows a tightening element for the rope of FIGS. 7 or 8.

Figure 10:
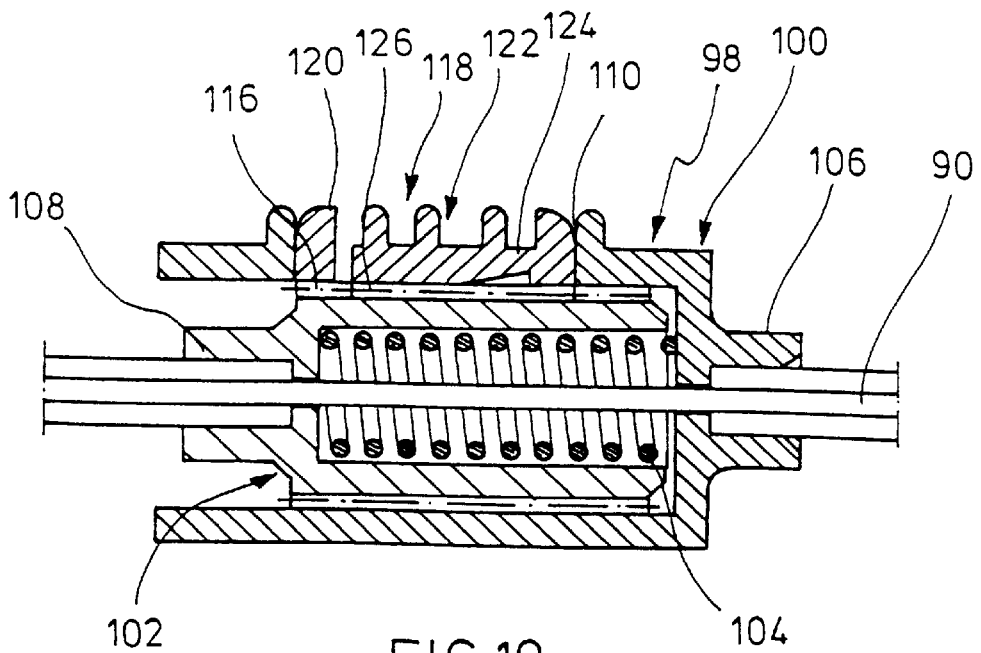

FIG. 10 shows a clearance balancing element for the pulling rope of FIGS. 7 or 8.

DETAILED DESCRIPTION OF THE INVENTION

Referring to FIG. 1, a first structural part 10 is shown to which bars 12, 14 of a neck rest which is not further shown are connected on a back of a vehicle seat. The first structural part 10 is height-displaceably supported along a second structural part (not shown) which is fixedly secured to the seat back. An idle roller 16 is above the first structural part 10. Further, a second idle roller 18 is rotatably supported in the seat structure of the vehicle seat which as was stated is not shown. The idle rollers 16, 18 have guided therearound a rope 20 which has a coupling part 22 in the form of a barrel. The rope 20 is connected to the first structural part at 24. If the rope is moved the first structural part 10 will also move along the double arrow 26.

FIG. 1 shows a coupling element 28 with an angulated coupling slot 30. The coupling element 28 is movably supported in the seat structure in a way not shown in detail. When the coupling part 22 is in the end portion 34 of the coupling slot 30 open at the other end and the coupling element 28 is moved in the direction of the double arrow 36 the rope will be moved in the described manner as well in order to displace the first structural part 10 in its height. In contrast, however, if the coupling element 28 is moved crosswise to the rope 20 a downward movement of the coupling element 28 of FIG. 1 would cause the coupling part 22 to get out of the slot 30 so that the rope 20 is no longer pulled now. The coupling element 28 is actuated via actuating means 38 which are coupled to the coupling element 28 and are also supported in the seat structure. An actuation of the actuating means 38 is accomplished via a coupling part 40 fixedly connected to the vehicle. As long as the actuating means 38 are adjacent to the coupling part 40 coupling is effected between the coupling element 28 and the coupling part 22. Uncoupling takes place in all the other cases so that the consequence of a displacement of the seat is no longer a displacement of the structural part 10 and, hence, the neck rest.

Parts in the embodiment of FIG. 2 which are identical to those of FIG. 1 are designated by the same reference numerals.

Referring to FIG. 2, the second structural part 42 can be seen on which the first structural part 10 is height-displaceably guided and which is fixedly arranged in the back of a vehicle seat (not shown). The structural part 42 also has supported thereon the upper idle roller 16. What can further be seen in FIG. 2 is a plate-like holder or supporting structure 44 for the seat (not shown), which is movable on rails (not shown) which are fixedly connected to the vehicle. A structure of the type is basically known and will not be described in detail. The support 44 has mounted thereon a component 46 which supports the idle roller 18 and which includes the parts 28 and 38 of FIG. 1, reference to which will be made in more detail below. Furthermore, FIG. 2 outlines the second coupling part 40 which is fixedly connected to the vehicle, e.g. the seat rail (not shown). FIG. 2 also outlines two Bowden cables 48, 50 the enclosures of which are located on the structural part 42 at 52 and 54. On the seat side, the enclosures are joined to a support in which the parts 28 and 38 of FIG. 1 are supported. The rope 20 which defines a loop via the structural part 42 and the components in FIG. 2 is led from the seat to the seat back through the enclosures 48, 50.

Referring to FIG. 3, a guiding rail 56 can be seen which is an elongated structural part made of plastic. The guiding rail 56 has an elongated slot which has a first straight guiding portion 58 and an angulated guiding portion 60 which merge into each other. The barrel 22, which is fixedly connected to the rope 20, is in the slot with the end of the second guiding portion 60 extending perpendicular to the extension of the first guiding portion 58. Therefore, the barrel 22 which is shown in this place cannot be moved by pulling the rope 20, but is locked in this position.

The upper surface of the guiding rail 56 has disposed therein a groove which has a first straight guiding portion 62 and an angulated straight guiding portion 64 which merge into each other. As can be seen the guiding portions 58, 62 extend in parallel and the angulation of the guiding portions 60, 64 of the two guidances is towards the same side. A locking element 66 the structure of which will be described below has a projection 68 which engages the groove. Finally, the guiding rail 56 laterally has a through slot 70 which receives the plate-shaped coupling element 28. The locking element 66 is pivotably supported on the coupling element at the left-hand end in FIG. 3.

What can be seen from FIG. 4 is that the guiding rail 56, which is formed from a suitable plastic material, is retained in an elongated holding element 72 which also supports the lower idle roller 18. The structural part 72 is fixedly connected to the retaining structure 44. The forward side of the seat is outlined as being the "front" and the rearward side of the seat is outlined as being the "rear". Thus, if the seat is moved a relative movement will result between the coupling part 40 fixedly connected to the vehicle and the structural part 72 or guiding rail 56.

The representation of FIG. 5 makes it evident that the barrel 22 is in the angulated end portion 34 of the slot 30 of the coupling element 28 when the barrel is in the first straight guiding portion 58 of the guiding rail 56. Thus, a movement of the coupling element 28 relative to the guiding rail 56 causes the rope 20 to move and, hence, the first structural part 10 to be displaced as shown in FIGS. 1 and 2. This is clearly pointed out once more in FIG. 6. What further can be seen from FIGS. 5 and 6 is that a trunnion 74 of the coupling part 40 engages a recess of the locking element 66. The locking element 66 is a U-shaped body the superposed legs of which are pivotably supported on the coupling element 28 at the left-hand end at 76. The coupling element 28 is plate-shaped and gets into engagement between the legs of the locking element, but is at a distance from the web of the U-shaped locking element 66, thus forming a recess which can be engaged by the trunnion 74. The result of this engagement is that the coupling element 28 is fixedly connected to the vehicle during this time while the seat moves with the guiding rail 56. This is the case if the seat (not shown) is in its foremost position. In FIG. 5, the parts are at a distance of 50 mm from the foremost position. When the seat is displaced from the foremost position the coupling element 28 is moved relative to the guiding rail 56 (whereas it is fixed relative to the vehicle) so that a relative displacement occurs between the guiding rail and the rope 10 and, hence, a displacement of the structural part 10 on which the neck rest is mounted. This position is such that the neck rest is raised if the seat is moved to the rear. Once a certain path is passed through the barrel 22 gets into the second guiding portion 60 of the slot of the guiding rail and, thus, is deflected and moved out of the end portion 34 of the coupling slot 30. When the coupling element 28 continues to move the barrel 22 will be led into the free region of the slot 30, which stops the barrel from being carried along. Therefore, another displacement of the seat no longer causes a displacement of the neck rest. However, the barrel 22 is located in the rectangular end portion of the second guiding portion 60 of the slot, which causes the neck rest to be locked in a corresponding way. The path through which the seat passes here is 120 mm, for example.

The last described operation is accomplished before the locking element 66 is pivoted by causing its projection 68 to engage the second guiding portion 64 of the groove as shown in FIGS. 3 and 4. In this way, the trunnion 74 gets out of engagement with the locking element 66 and, then, any further rearward movement of the seat or the guiding rail 56 will have no effect on the neck rest position. Therefore, the seat may be located in any manner in a rearward position up to the final stop. If the seat is displaced in an inverse way the guiding rail 56 will approach the trunnion 74. This one strikes against the stop surface 78 of the plate-shaped coupling element facing it, causing the latter to be moved along the guiding slot 70. As a result of the projection 68 engaging the guiding groove the locking element 66 is pivoted back so that the trunnion 74 now is in the recess of the locking element 66 again. The slot 30 of the coupling element 28 is engaged by the barrel 22 again, guiding it along the second guiding portion 60 until the barrel gets into the end portion 34 of the slot 30 and is carried along in this way, which appropriately displaces the neck rest downwards until the seat reaches its foremost position.

As can be seen the guidances of the barrel 22 overlap each other in the guiding portion 60 and the slot 30 of the coupling element 28 so that the rope 20 will be locked in any case whatever its position might be and, thus, an arbitrary displacement of the neck rest cannot be made from outside.

FIG. 7 shows a Bowden cable which generally is designated by 20 in conformity with FIGS. 1 and 2 and which has portions 48, 50. What further can be seen is the barrel 22 which is connected to the exposed rope 90. Two more barrels 92, 94 are mounted at the ends of the rope for connection to the structural parts 10, 42 in the seat back. The Bowden cable 20 has integrated therein a tensioning member 96 and a clearance balancing member 98 which will be explained below with reference to FIGS. 9 and 10.

The tensioning member 96 is composed of an outer cylindrical casing part 100 with a left-hand open end and an inner casing part 102 with a right-hand open end, which parts are telescopically fitted into each other. A spring 104 is disposed between the parts and seeks to force these parts apart. The right-hand end of the outer casing part 100 has a portion 106 to receive the enclosure of the Bowden cable 20. The left-hand end of the inner part 102 has a portion 108 to receive the enclosure of the Bowden cable 20. Thus, the device described moves the enclosure ends apart to put the Bowden cable under a tension. The outer casing part 100 has a radial recess 110 to receive a locking element 112 the inside of which has a toothing 114 which cooperates with a circumferential toothing 116 of the inner casing part 102. The toothings 114, 116 are interlocked in the position shown in FIG. 9. This locates the positions of the casing parts 100, 102 relative to each other.

As can be seen from FIG. 8 the locking element 112 has a leg 118a which protrudes downwards and extends through the two casing parts 100, 102, but is not shown in FIG. 9. This leg 118a cooperates with the casing part 102 as follows. The locking element 112 as delivered and preassembled is extracted from the casing part 100 by a certain amount. In this first or as-delivered position, the leg 118a cooperates with the inner casing part 102 in such a way that it is axially located with respect to the outer casing part 100. In this position, the spring 104 is compressed by a certain degree. If the locking element 112 is pushed into the outer casing part 100 after the tensioning member 96 is assembled the locking element gets out of engagement with the inner casing part 102. This enables the spring to move apart the two casing parts 100, 102 and, thus, to tension the Bowden cable. Upon termination of this operation the locking element 112 is completely forced into the position shown in FIG. 9 in which the casing parts 100, 102 are interlocked again.

Since the clearance balancing member 98 of FIG. 10 has the same parts as the tensioning member 96 of FIG. 9 those parts are designated by the same reference numerals. The difference from FIG. 9 is that the locking element 118 is of a different structure. The locking element 118 has a frame which is outlined at 120 and is seated in the recess 110 of the outer casing part 100. The frame surrounds a tongue 122 which is hinged on the frame 120 as is outlined at 124. The tongue 122 has a saw toothing 126 and the toothing 116 of the inner casing part 102 is complementary. Thus, the inner casing part 102 can move outwardly from the outer casing part 100 with the toothings acting as a ratchet. The toothings 116, 126 may be disengaged by causing the tongue 122 to give way. This allows a step-by-step movement of the inner casing part out of the outer casing part 100 until the compression of the spring 104 is balanced out by the reaction force exerted by the Bowden cable enclosure. Thus, the Bowden cable is automatically tensioned as soon as there is a certain slackness. In such case, the force of the spring is higher than the reaction force exerted by the enclosure until an equilibrium is restored again by a corresponding relative displacement between the inner and outer casing parts. casing parts 100, 102 relative to each other is located in a more outward position of the locking element 118. Only if the locking element 118 is completely pushed into the outer casing part 100 the parts 100, 102 may be moved apart by means of the spring 104 until locking is effected by the tongue 122.

What is claimed is:

1. A system which selectively displaces a neck rest in response to a displacement of a vehicle seat in an automobile, the neck rest being mounted to a first structural part (10) which is height-displaceably mounted to a second structural part (42), which, in turn, is fixedly secured to the rest of the seat, the system comprising:
    a rope (20) defining a loop to transfer a force along the loop, one section of the rope (20) being connected to the first structural part (10), the rope being guided about two spaced idle rollers, one of the rollers being rotatably supported by the seat and the other by the second structural part (42);
    a first coupling part (22) fixedly connected to the rope (20);
    a second coupling part (40) fixedly connected to the vehicle;
    a coupling element (28) movably supported on the seat and selectively engageable with the first coupling part (22);
    an actuating element (38) for actuating the coupling element (28), said actuating element being on the seat and adapted to coact with the second coupling part in response to the position of the seat such that upon displacement of the seat from a forward position rearwardly along a predetermined path or upon displacement of the seat from a rear position forwardly after a predetermined distance, the second coupling part coacts with the actuating element such that the coupling element is positively connected to the first coupling part and the second coupling part; and
    a locking mechanism which locks the first coupling part when the coupling element (28) is disengaged from the first coupling part (22).

2. The system of claim 1, further comprising:
    a first elongated guiding element fixedly connected to the seat and having first and second guiding portions (58, 60) by which the first coupling part (22) is guided; and
    a locking element (66) which is guided along a second elongated guiding element fixedly secured to the seat and having third and fourth guiding portions (62, 64) with the first and third guiding portions extending approximately parallel, and the second and fourth guiding portions angulated with respect to the first and third guiding portions, respectively towards the same side; wherein
    the coupling element (28) is linked to the locking element (66) and guided along a third elongated guiding element (70) fixedly secured to the seat, and extending approximately parallel to the first and third guiding portions, the coupling element (28) engaging the second coupling part (40) if the seat is in the forward position and the locking element (66) is in the third guiding portion, the second coupling part (40) being disengaged from the locking element if the locking element (66) is in the fourth guiding portion (64);
    the coupling element (28) has a coupling slot (30) such that the first coupling part (22) is caught in an end portion (34) of the coupling slot if the first coupling part (22) is in the first guiding portion (58) whereby a movement of the coupling part (28) in either direction along the rope causes the first coupling part (22) to move, however, the first coupling part (22) is not caught in the end portion (34) of the coupling slot (30) if the first coupling part (22) is in the second guiding portion (60); and
    the coupling element (28) has a stop surface (78) which restricts an engagement recess of the locking element (66) which recess is adapted to catch the second coupling part (40), said recess releases the second coupling part and becomes free when the locking element (66) is pivoted upon an engagement of the locking element (66) with the fourth guiding portion.

3. The system of claim 2, wherein the second guiding portion (60) and the fourth guiding portion (64) are arranged such that the first coupling part (22) disengages with the end portion (34) of the coupling slot (30) prior to the disengagement of the second coupling part (40) from the locking element (66).

4. The system of claim 2, wherein the second guiding portion (60) has an end portion, for receiving the first coupling part (22) therein and restraining the first coupling part from moving in both directions along the rope.

5. The system of claim 2, wherein the first, second and third guiding elements are formed on an integral elongated guiding rail (56) of plastic material or metal which rail being fixed to a retaining plate (44) on the seat.

6. The system of claim 5, wherein the guiding rail (56) is mounted to an elongated structural part (72) of plastic material or metal which supports one of the idle rollers (18) and which is mounted to the retaining plate (44) of the seat.

7. The system of claim 5, wherein the third guiding element is formed as a slot (70) on the guiding rail, the slot guiding the coupling element (28) which is a plate member.

8. The system of claim 5, wherein the second guiding element is formed as a guiding groove on the guiding rail (56) which guiding groove is opened upwardly, a follower projection (68) of the locking element (66) engaging the guiding groove.

9. The system of claim 2, wherein the locking element (66) has a U-shaped portion, distal ends of the legs of the U-shaped portion being linked to the coupling element (28), and the engagement recess of the locking element (66) is defined by an edge of the coupling element (28) and the legs and the web of the U-shaped portion.

10. The system of claim 2, wherein the second coupling part (40) has a tab (74) which engages the engagement recess of the locking element (66).

11. The system of claim 1, wherein the rope is formed by the core of a cable (48, 50), the envelope of the cable being secured to the second structural part (42) on one side and to a holding portion (44) for the seat on the other side.

12. The system of claim 11, wherein at least one of a tensioning member (96) and a clearance balancing member (98) is provided for the rope, each of said members (96, 98) has two telescopically cooperating outer and inner parts (100, 102) which are biased away from each other by a spring (104) placed therebetween to move the parts, the core (90) of the cable extending through both parts while the envelope of the cable is engaged with the parts (100, 102), and a locking element (112, 118) being radially movably supported by the outer part (100) to cooperate with the inner part (102) to lock both parts against each other.

13. The system of claim 12, wherein, in the tensioning member (96), the locking element (112) has an extension (118a) which extends transversely through the outer part (100) and the locking element (112) has three positions with respect to the direction transverse to the cable or core, respectively: an outer position wherein the extension (118a) cooperates with the inner portion (102) such that the inner part (102) is axially fixed relative to the outer part, an intermediate position wherein both parts (100, 102) are freely axially movable, and an inner position wherein the locking element (112) lockingly engages the inner part (102).

14. The system of claim 12, wherein the inner part (102) has a toothing (116) on the outer side thereof and a toothing (114) of the locking element (112) cooperates with the toothing (116) of the inner part (102).

15. The system of claim 12, wherein, in the clearance balancing member (98), a toothing (126) of the locking element (118) is formed at a resilient tongue (122) of the locking element (118), the toothing (126) being a saw toothing, and a toothing (116) of the inner part (102) is formed complementarily to cooperate with the toothing (126) of the locking element so that the spring (104) stepwisely moves the parts away from each other by sliding of the toothings (116, 126) over each other until a sufficient reaction force is exerted by the envelope of the cable.

16. The system of claim 15, wherein, in the clearance balancing member (98), the locking element (118) has an extension (130) which extends transversely through the outer part (100) and the locking element (118) has three positions with respect to the direction transverse to the cable or core, respectively: an outer position wherein the extension (130) cooperates with the inner portion (102) such that the inner part (102) is axially fixed relative to the outer part, an intermediate position wherein both parts (100, 102) are freely axially movable, and an inner position wherein the locking element (118) lockingly engages the inner part (102).

17. A neck rest adjusting system which selectively displaces a neck rest of a seat in response to a displacement of the seat in a vehicle, the seat is mounted to the vehicle so as to be movable between a front position and a rear position via a predetermined intermediate position, said system comprising:

first and second structural parts, the neck rest being mounted to the first structural part which is adjustable in height with respect to the second structural part which, in turn, is fixedly secured to the seat;

an adjustment transmitting element connected to the first structural part for selectively adjusting a height of the first structural part with respect to the second structural part;

a first coupling part fixedly connected to the adjustment transmitting element;

a second coupling part fixedly connected to the vehicle; and a coupling element movably supported on the seat and selectively engageable with the first coupling part for selectively driving the first coupling part, hence, the adjustment transmitting element; wherein when the seat is at a location between the front position and the intermediate position, the coupling element positively connects the first coupling part to the second coupling part, whereby a displacement of the seat along a first path between the front position and the intermediate position will result in a corresponding displacement of the neck rest via the first and second coupling parts, the coupling element and the adjustment transmitting element; and when the seat is at a location between the rear position and the intermediate position, the coupling element disconnects the first coupling part from the second coupling part, whereby a displacement of the seat along a second path between the rear position and the intermediate position will not cause the neck rest to be displaced.

18. The system of claim 17, wherein the adjustment transmitting element is arranged so that when the seat moves along the first path towards the front position, the height of the first structural part, hence, the neck rest, will decrease, and vice versa.

19. The system of claim 17, wherein the adjustment transmitting element is a rope being guided about two spaced idle rollers, one of the rollers being rotatably supported by the seat and the other by the second structural part.

20. The system of claim 17, further comprising a locking mechanism for locking the adjustment transmitting element when the seat travels along the second path, whereby preventing neck rest from being displaced when the seat is on the second path.

21. The system of claim 17, further comprising a locking element mounted on the coupling element for selectively engaging the second coupling part; and a guiding member fixedly connected to the seat for guiding the first coupling part and the locking element when the seat moves between the front and rear positions.

22. The system of claim 21, wherein the guiding member comprises a first elongated guiding element having first and second guiding portions along which the first coupling part is guided;

a second elongated guiding element having third and fourth guiding portions along which the locking element is guided, wherein the first and third guiding portions extend approximately parallel to each other, and the second and fourth guiding portions extend, at angles, from the first and third guiding portions, respectively, and away from the second coupling part; and a third elongated guiding element extending approximately parallel to the first and third guiding portions along which the coupling element is guided, wherein the coupling element engages the second coupling part, via the locking element, if the seat is on the first path and the locking element is in the third guiding portion, and the second coupling part is disengaged from the locking element, hence, the coupling element, if the locking element is in the fourth guiding portion.

23. The system of claim 22, wherein the coupling element has a coupling slot such that the first coupling part is caught in a portion of the coupling slot if the first coupling part is in the first guiding portion, whereby a movement of the coupling part in either direction along the rope causes the first coupling part to move in the same direction;

wherein the first coupling part is not caught in said portion of the coupling slot if the first coupling part is in the second guiding portion, whereby a movement of the coupling part in either direction along the rope will not cause the first coupling part to move.

24. The system of claim 22, wherein the coupling element has a surface arranged to be struck upon by a projection of the second coupling part as the coupling element approaches the second coupling part when the seat moves from the rear position to the front position, thereby causing the locking element to move from the fourth guiding portion into the third guiding portion.

25. The system of claim 22, wherein the locking element is mounted pivotably on the coupling element, and has an engagement recess which is adapted to catch the second coupling part, said recess releases the second coupling part and becomes free when the locking element is pivoted away from the second coupling element upon an engagement of the locking element with the fourth guiding portion.

26. The system of claim 22, wherein the second guiding portion and the fourth guiding portion are arranged such that, when the seat moves from the front position towards the rear position, the first coupling part disengages from the coupling element before the second coupling part disengages from the locking element.

27. The system of claim 22, wherein the locking mechanism comprises an end portion of the second guiding portion, said end portion adapted to receive the first coupling part therein and restraining the first coupling part from moving in either direction along the rope.

28. The system of claim 21, wherein the guiding member is formed as an integral elongated guiding rail of plastic material or metal.

29. The system of claim 28, wherein the adjustment transmitting element is a rope being guided about first and second spaced idle rollers rotatably supported by the seat and the second structural part, respectively;

the guiding rail is formed in an elongated structural part of plastic material or metal which supports the first idle roller and which is mounted to the seat.

30. The system of claim 28, wherein the second guiding element is formed as a guiding groove on the guiding rail which guiding groove is opened upwardly, a follower projection of the locking element engaging the guiding groove.

31. The system of claim 21, wherein the locking element has a U-shaped portion including two legs connected by a web, distal ends of the legs of the U-shaped portion being pivotably linked to the coupling element;

wherein an edge of the coupling element, and the legs and the web of the U-shaped portion together define an engagement recess for selectively catching a projection of the second coupling part.

* * * * *